(12) United States Patent
Xie et al.

(10) Patent No.: US 7,189,985 B2
(45) Date of Patent: Mar. 13, 2007

(54) TRACKING SEPARATION BETWEEN AN OBJECT AND A SURFACE USING A REDUCING STRUCTURE

(75) Inventors: Tong Xie, San Jose, CA (US); Marshall T DePue, San Jose, CA (US); Susan Hunter, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 271 days.

(21) Appl. No.: 10/977,720

(22) Filed: Oct. 30, 2004

(65) Prior Publication Data

US 2006/0091298 A1    May 4, 2006

(51) Int. Cl.
  *G01N 21/86* (2006.01)
(52) U.S. Cl. .......................... 250/559.29; 250/559.24; 250/559.38
(58) Field of Classification Search ........... 250/559.29, 250/559.24, 559.26, 559.38; 356/399, 400; 345/157, 161, 163, 166
See application file for complete search history.

(56) References Cited

U.S. PATENT DOCUMENTS

| | | | |
|---|---|---|---|
| 5,644,139 A | 7/1997 | Allen et al. | |
| 5,729,009 A | 3/1998 | Dandliker et al. | |
| 6,222,174 B1 | 4/2001 | Tullis et al. | |
| 6,642,506 B1 | 11/2003 | Nahum et al. | |
| 6,747,284 B2 * | 6/2004 | Bohn | .............. 250/559.29 |

* cited by examiner

*Primary Examiner*—Que T. Le

(57) ABSTRACT

Tracking separation between an object and a surface involves illuminating the surface and reducing the collection angle of light that reflects off of the surface in response to a change in separation between the object and the surface. Reducing the collection angle of light that reflects off of the surface causes the amount of light that is detected to be dependent on the separation distance between the object and the surface. The amount of detected light is then used as an indication of the separation distance.

20 Claims, 6 Drawing Sheets

TRACKING SEPARATION BETWEEN AN OBJECT AND A SURFACE USING A REDUCING STRUCTURE

BACKGROUND OF THE INVENTION

A known optical navigation technique involves illuminating a surface, capturing successive images of the illuminated surface, and correlating the successive images with each other to determine relative lateral displacement between the images. Examples of the optical navigation technique are described in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein. Another optical navigation technique utilizes spatial filtering as described in U.S. Pat. No. 5,729,009, entitled METHOD FOR GENERATING QUASI-SINUSOIDAL SIGNALS. These optical navigation techniques are used to track the lateral movement of a navigation device such as a computer mouse relative to a navigation surface.

In many optical navigation applications there is a need to determine the separation distance between the optical navigation device and the navigation surface. For example, it is desirable to know when a computer mouse has been lifted off of the surface so that the navigation function can be suspended. Suspending the navigation function while the computer mouse is lifted off of the surface enables a user to move a cursor over long distances by "skating" the mouse. With a computer mouse that uses a rolling ball to track lateral motion, there is no need to detect lift off from the surface because the ball stops rolling as soon as it looses contact with the navigation surface. In contrast, a computer mouse that uses optical navigation may continue to track changes in lateral position while the mouse is lifted off of the surface and moved across the surface. Continuing to track changes in lateral position while the mouse is lifted off the surface makes it difficult to skate the mouse.

SUMMARY OF THE INVENTION

In accordance with the invention, a method for tracking separation between an object and a surface involves illuminating the surface and reducing the collection angle of light that reflects off of the surface in response to a change in separation between the object and the surface. Reducing the collection angle of light that reflects off of the surface causes the amount of light that is detected to be dependent on the separation distance between the object and the surface. The amount of detected light is then used as an indication of the separation distance.

An optical navigation device that is configured for lift detection typically includes a light source, a sensor, and a reducing structure. The reducing structure is configured to pass light at a first collection angle when the surface is in a near position. The intensity of the light received at the sensor with the surface in this position is basically the same as it would be without the reducing structure. When the surface changes to a far position (e.g., by lifting the optical navigation device off of the navigation surface), the reducing structure causes the collection angle of the reflected light to be reduced. The reduction in the collection angle reduces the amount of reflected light that is collected by the image sensor. The reduction in the amount of collected light is used to identify the lift condition.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description similar reference numbers are used to identify similar elements.

DETAILED DESCRIPTION

Figure 1:
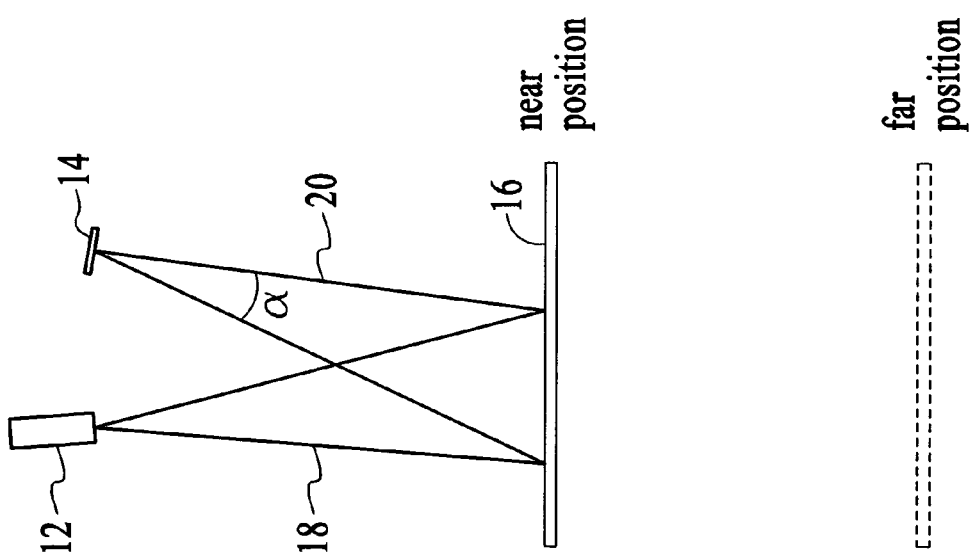
FIG. 1 depicts the path that light travels between a light source, a surface, and a sensor when the surface is in a near position.

In accordance with the invention, the collection angle of light relative to a sensor is reduced to produce an optical system that can track separation between an object and a surface. The basic principles of the separation tracking technique are described with reference to FIGS. 1–5. FIG. 1 depicts a light source 12, a sensor 14, and a surface 16 that is separated from the light source 12 and sensor by a first distance (where the surface is referred to as being in the near position). The sensor 14 may be a 1-dimensional (1-D) or 2-dimensional (2-D) sensor array that includes an array of individual photosensors that generate navigation information such as image information or spatial filtering information or a single sensor such as a single photodiode. FIG. 1 also depicts the path that light 18, 20 travels between the light source 12, the surface 16, and the sensor 14. The path is shown relative to the center of the sensor 14. When the surface is in the near position, the light reflects off of the surface as indicated by light path 20. The collection angle of the reflected light relative to the center of the sensor 14 is identified as $\alpha$.

Figure 2:
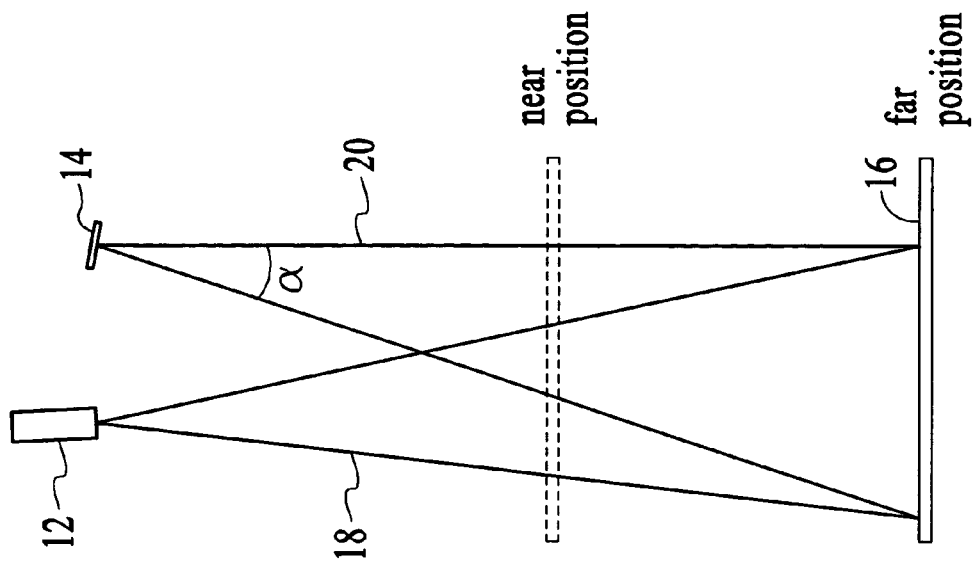
FIG. 2 depicts the path that light travels between a light source, a surface, and a sensor when the surface is in a far position.

FIG. 2 depicts the path that light 18, 20 travels between the light source 12, the surface 16, and the sensor 14 when the surface 16 and light source/sensor 12, 14 are separated by a second distance (where the surface is referred to as being in the far position). When the surface 16 is in the far position, the light reflects off of the surface as indicated by light path 20. As depicted in FIG. 2, the collection angle, $\alpha$, of the light relative to the center of the sensor 14 does not change from the collection angle depicted in FIG. 1. That is, the collection angles, $\alpha$, in FIGS. 1 and 2 are the same. Because the collection angle does not change as the separation distance between the surface 16 and the light source/sensor 12, 14 changes, the intensity of the light detected by the sensor 14 remains nearly constant or changes very slowly with changes in the separation distance. Although the example of FIGS. 1 and 2 describes diverging light, the light source 12 may produce collimated or converging light. In these cases, the collection angle may change somewhat with changes in the separation distance depending on the implementation specifics. In these configurations, the light detected by the sensor changes slowly with changes in the separation distance. The light intensity measurements in these configurations are not particularly useful for separation tracking.

Figure 3:
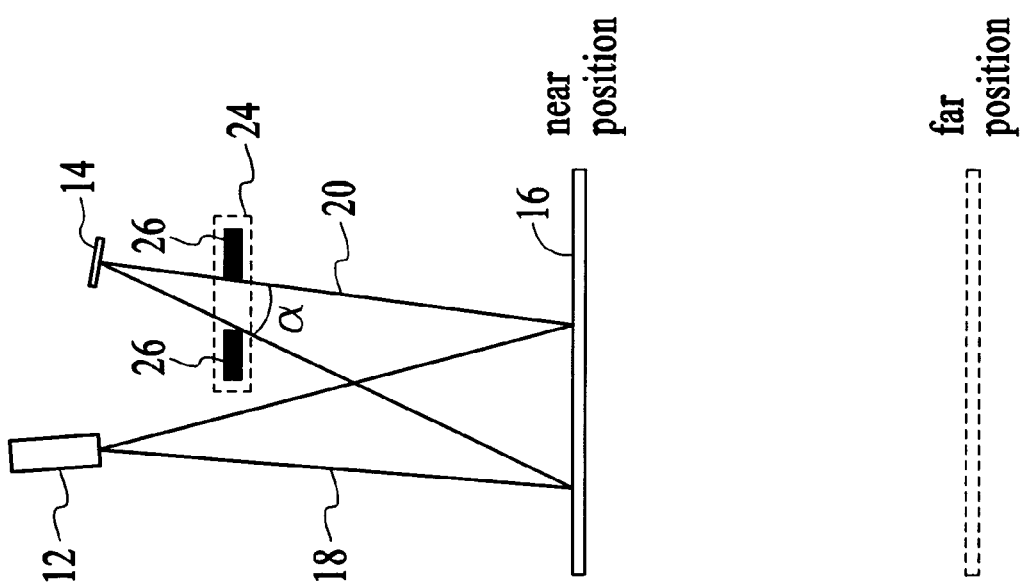
FIG. 3 depicts the light source, sensor, and surface positions from FIG. 1 with the addition of a reducing structure that is configured to reduce the collection angle of the light relative to the sensor.

In accordance with the invention, separation between the surface and the light source/sensor is tracked by reducing the collection angle of light in response to a change in separation between the surface and the light source/image sensor. FIG. 3 depicts the light source 12, sensor 14, and surface 16 positions from FIG. 1 with the addition of a reducing structure 24 that is configured to reduce the collection angle of light relative to the sensor 14 in response to a change in the separation distance. In the embodiment of FIG. 3, the reducing structure 24 is an aperture 26 that is located in an optical path between the light source 12 and the sensor 14. Specifically, the reducing structure is configured to reduce the collection angle of the light that reflects off of the surface when the separation distance between the surface 16 and the light source/sensor 12, 14 is increased from a near position to a far position.

Figure 4:
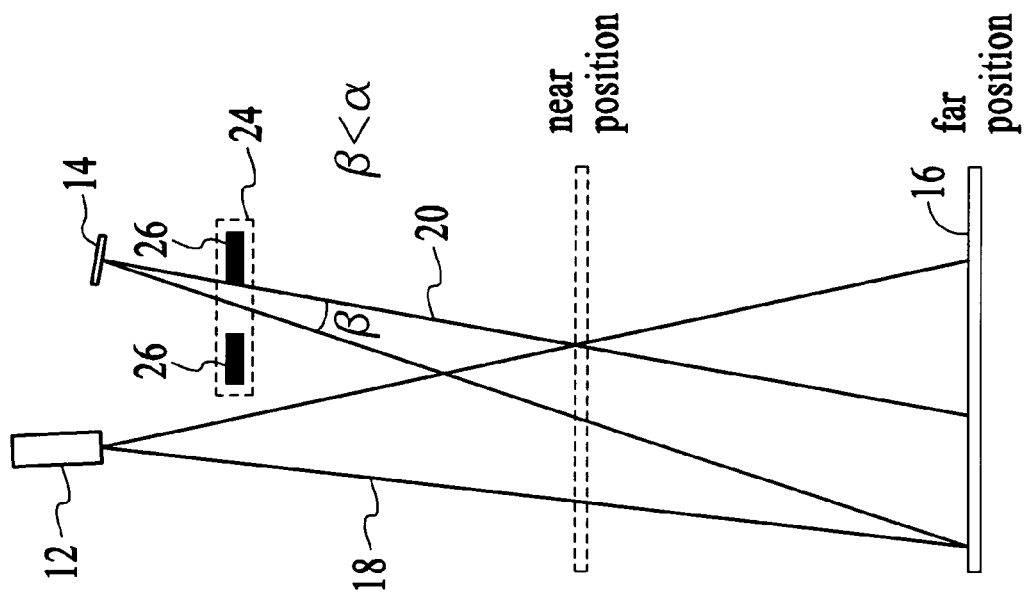
FIG. 4 depicts the reduced collection angle that exists when the surface is in the far position as opposed to the near position shown in FIG. 3.

As depicted in FIG. 3, the reducing structure 24 is configured to pass light 20 at the collection angle $\alpha$ when the surface is in the near position. In this configuration, the intensity of the light received by the sensor 14 is basically the same as it would be without the reducing structure 24. However, when the surface 16 changes to the far position (either by movement of the light source/sensor 12, 14, movement of the surface 16, or movement of both the light source/sensor 12, 14 and the surface 16), the reducing structure 24 causes the collection angle of the reflected light to be reduced. FIG. 4 depicts the light source 12, sensor 14, and reducing structure 24 of FIG. 3 with the surface 16 located in the far position as opposed to the near position. As depicted in FIG. 4, the reducing structure 24 causes the collection angle to be reduced from collection angle $\alpha$ to collection angle $\beta$, where $\beta<\alpha$. The reduction in the collection angle from $\alpha$ to $\beta$ causes a reduction in the amount of light that is collected by the sensor 12. The reduction in the amount of collected light is used to track the separation between the surface 16 and the light source/sensor 12, 14.

Figure 5:
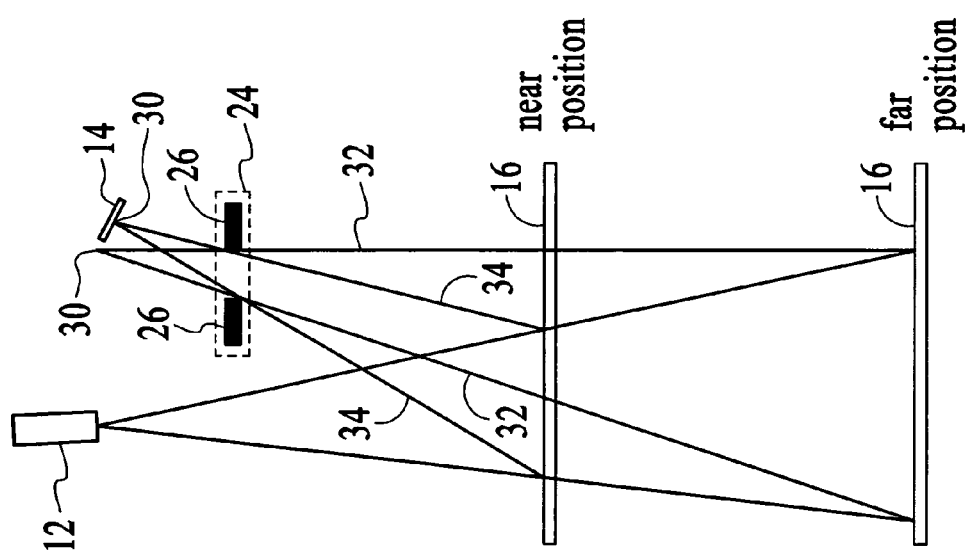
FIG. 5 illustrates changes in the intensity center of the reflected light that occur with changes in the surface position due to the reducing structure.

While FIGS. 3 and 4 depict a change in the collection angle relative to the center of the sensor 14, the reducing effect of the reducing structure 24 can also be illustrated relative to the intensity center of the reflected light. FIG. 5 illustrates how the intensity center 30 of the reflected light 32, 34 changes with changes in the surface 16 position. Referring to FIG. 5, the system is configured such that the intensity center of the reflected light 34 is at the center of the sensor 14 when the surface 16 is in the near position. However, as the surface 16 moves further away from the light source/sensor 12, 14, the reducing structure 24 causes the intensity center 30 of the reflected light 32 to shift away from the center of the sensor 14. As configured in FIG. 5, when the surface 16 is in the far position, the intensity center of the reflected light is outside the footprint of the sensor 14. The shift in the intensity center of the reflected light changes the intensity of light that is detected by the sensor 14. The change in the detected light is used to track separation between the surface 16 and the light source/sensor 12, 14.

As stated above, the change in the detected light caused by the reducing structure 24 in response to increased separation between the surface 16 and the light source/sensor 12, 14 is used to track separation between the surface 16 and the light source/sensor 12, 14. In an embodiment in accordance with the invention, the technique is used to determine when an optical navigation device, such as an optical computer mouse, is lifted off of a surface. Detecting when an optical navigation device has been lifted off of a surface (referred to herein as a "lift condition") involves establishing a lift threshold that is expressed as a characteristic of the detected light (e.g., light intensity), detecting the light that is incident on the sensor, and then comparing the characteristic of the detected light to the lift threshold. If the amount of light detected by the sensor drops below the lift threshold, a lift condition is identified. Once the amount of light detected by the sensor goes above the lift threshold, the lift condition is ended.

Figure 6:
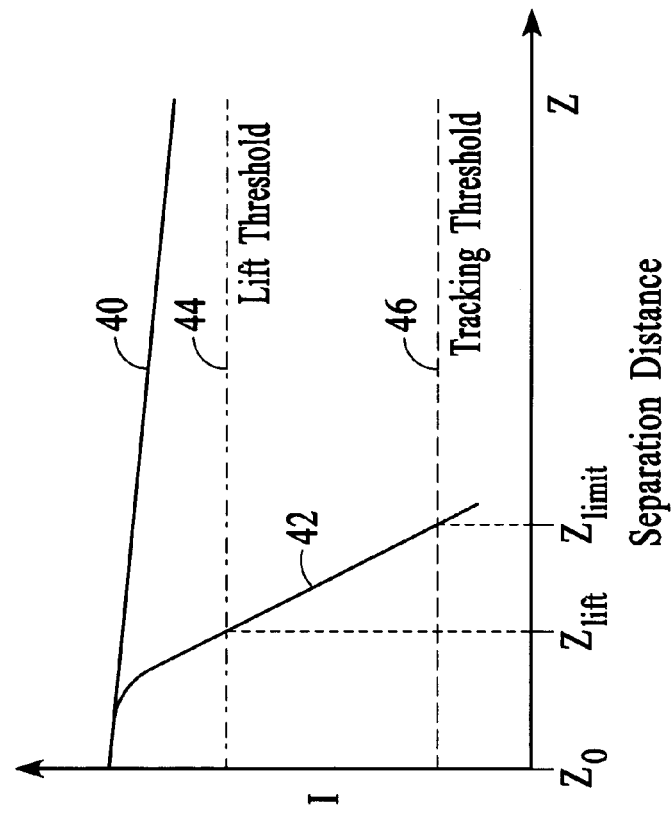
FIG. 6 depicts a graph of light intensity at a sensor vs. the separation distance between a surface and an optical navigation device for the case in which a reducing structure is not used and for the case in which a reducing structure is used.

FIG. 6 depicts a graph of total light intensity, I, at the sensor vs. the separation distance (e.g., the z dimension) between a surface and an optical navigation device for the case in which a reducing structure is not used (graph line 40) and for the case in which a reducing structure is used (graph line 42). The graph also depicts a lift threshold (dashed line 44) and a tracking threshold (dashed line 46) relative to the two graphs. In the case where a reducing structure is not used (graph line 40), the intensity of the detected light decreases relatively slowly as the distance between the surface and the optical navigation device increases. In this case, the light intensity never drops below the lift threshold over the separation distance that is included in the graph.

In the case where a reducing structure is used (graph line 42), the intensity of the detected light decreases relatively quickly as the distance between the surface and the optical navigation device increases. At the point where the light intensity drops below the lift threshold (referred to as the lift distance $Z_{lift}$), a lift condition is identified. The lift condition exists for as long as the detected light intensity remains below the lift threshold. The sensitivity of lift detection can be adjusted by adjusting the lift threshold. For example, lowering the lift threshold will cause a lift condition to be indicated at a larger separation distance. In a computer mouse application, the lift threshold may be pre-established to indicate a lift condition as soon as the computer mouse looses contact with the navigation surface. The lift threshold may be pre-established at a fixed setting by the product manufacturer. Alternatively, the lift threshold may be adjusted by the user of the mouse through, for example, a software interface.

The tracking threshold 46 depicted in FIG. 6 indicates the minimum light intensity that is required to support reliable lateral position tracking (e.g., in the x-y plane). The point at which the light intensity drops below the tracking threshold is identified as the tracking limit ($Z_{limit}$). The tracking limit is depicted relative to the lift threshold to illustrate that a lift condition is reached at a separation distance that is less than the tracking limit (i.e., $Z_{lift} < Z_{limit}$). That is, a lift condition exists even though reliable lateral position tracking is still possible. Although the optical navigation device is capable of reliably tracking lateral motion while the optical navigation device is lifted off of the surface, in computer mouse applications, it is desirable to purposefully suspend lateral navigation once the computer mouse is lifted off of the surface so that a user can move a cursor long distances by skating the computer mouse. In an alternative embodiment, the reducing structure is placed at a specific distance and with a specific configuration to create a condition in which the lift distance equals the tracking limit (i.e., $Z_{lift} = Z_{limit}$). In this case, the lateral position tracking is stopped at the tracking limit.

Figure 7A:
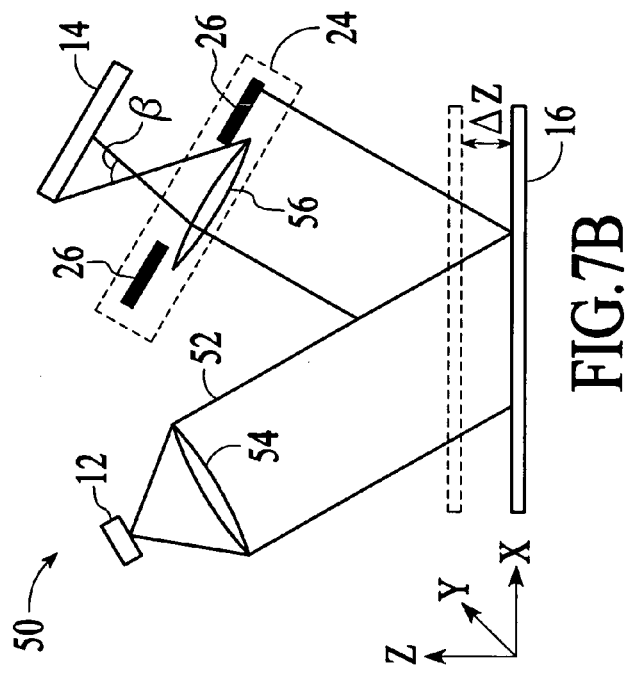
FIG. 7A depicts a system for tracking separation between a surface and a light source/image sensor that utilizes collimated light where the surface and the light source/image sensor are separated by a distance that is optimized for optical navigation in the lateral direction.
Figure 7B:
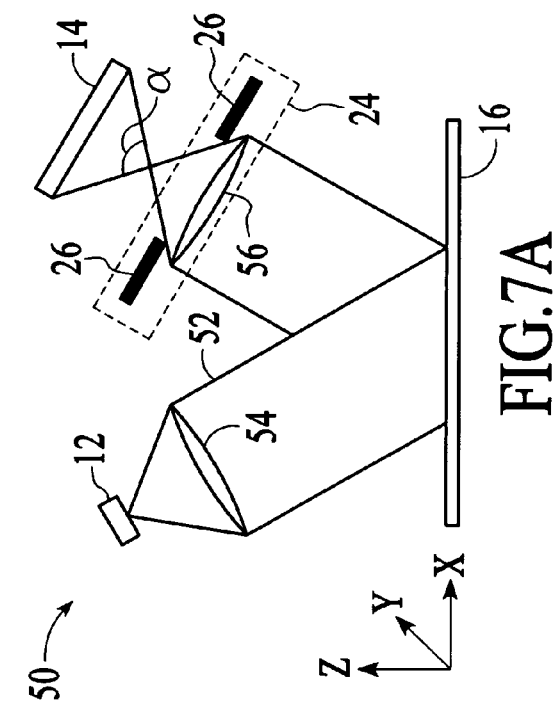
FIG. 7B depicts the system of FIG. 7A where the surface and the light source/image sensor are separated by a distance that is greater than the separation distance of FIG. 7A.

FIGS. 7A and 7B depict a system 50 for tracking separation between a surface 16 and a light source/sensor 12, 14 that utilizes a 1-D or 2-D image sensor as the sensor and collimated light 52. The system 50 includes a lens 54 to collimate light from the light source 12 and a reducing structure 24 that includes an aperture 26 and a lens 56 to reduce the collection angle of the reflected light relative to the image sensor 14. FIG. 7A depicts the case in which the surface 16 and the light source/image sensor 12, 14 are separated by a distance that is optimized for optical navigation in the lateral direction (e.g., the x-y plane). For example, in an optical mouse application, this is the separation that exists when the computer mouse is sitting on top of the navigation surface. FIG. 7B depicts the case in which the surface 16 and the light source/image sensor 12, 14 are separated by a distance (e.g., in the z-dimension) that is greater than the separation distance of FIG. 7A by Δz. For example, in an optical mouse application this is the separation that exists when the computer mouse has been lifted off of the navigation surface.

Figure 8A:
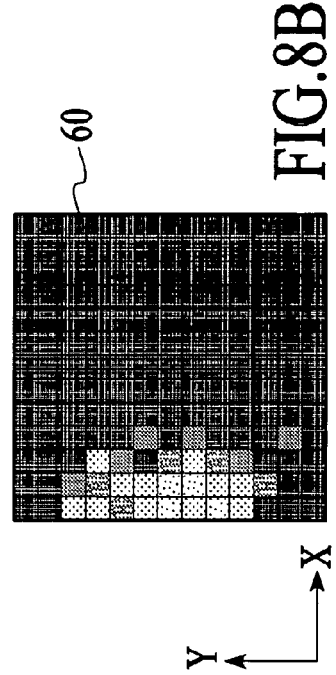
FIG. 8A depicts image information captured by the image sensor with the surface located in the position of FIG. 7A.

Operation of the system 50 depicted in FIGS. 7A and 7B begins with generating light from the light source 12. The light from the light source 12 is collimated by the lens 54 and the collimated light 52 is incident on the surface 16. A portion of the collimated light reflects off of the surface 16 and is subjected to the reducing structure 24. Light that passes through the reducing structure 24 and that is within the collection angle from which light is received by the image sensor 14 is detected by the image sensor 14. The light detected by the image sensor 14 is converted to navigation information that is used to determine if a lift off condition exists. When the separation distance depicted in FIG. 7A exists, most of the reflected light passes through the reducing structure and the intensity center of the reflected light is aligned near the center of the image sensor 14. The collection angle of the light relative to the image sensor 14 is identified in FIG. 7A as α. An example of the navigation information 58 captured by the image sensor 14 in this case is depicted in FIG. 8A. As depicted in FIG. 8A, the intensity of the detected light is greatest near the center of the image sensor 14 and decreases as the distance from the center increases.

Figure 8B:
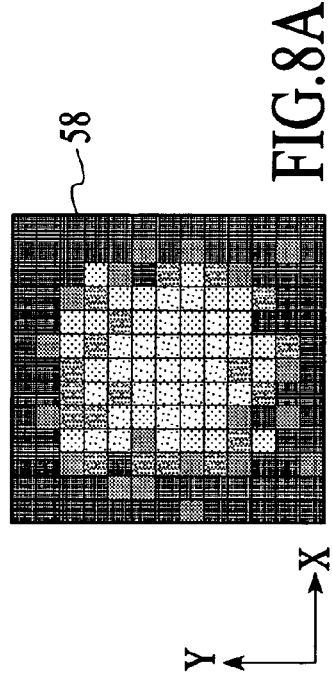
FIG. 8B depicts image information captured by the image sensor with the surface located in the position of FIG. 7B.

When the separation distance depicted in FIG. 7B exists, a portion of the reflected light is prevented from being detected by the image sensor 14. This is the case because the reducing structure 24 causes the collection angle of the light to shrink from a first collection angle to a reduced collection angle in response to the change in separation as described above with reference to FIGS. 1–5. The reduced collection angle of the light relative to the image sensor 14 is identified in FIG. 7B as β, where β<α. An example of the navigation information 60 captured by the image sensor 14 in this case is depicted in FIG. 8B. As depicted in FIG. 8B, the intensity center of the detected light is no longer near the center of the image sensor 14 but has shifted towards an edge of the image sensor 14. The change in the detected navigation information is used to determine whether or not a lift condition exists.

Different characteristics of the detected light can be used to determine if a lift condition exists depending on the implementation (e.g., single sensor, image correlation, spatial filtering). For example, the navigation information in the form of 1-D or 2-D image information can be reduced to a single total light intensity value that is used as the basis for lift detection. In this case, the lift threshold is pre-established as a light intensity value that is compared to the detected light intensity value. Alternatively, the navigation information can be examined in terms of, for example, a count of the number of light pixels (i.e., the number of individual photosensors that have a minimum brightness), a count of the number of dark pixels, the center of mass of the light distribution over the detector pixels, or a measure of the change in light intensity (i.e., the light gradient). Although some characteristics of the detected light are described, other characteristics of the detected light can be used to determine a lift condition.

Figure 9:
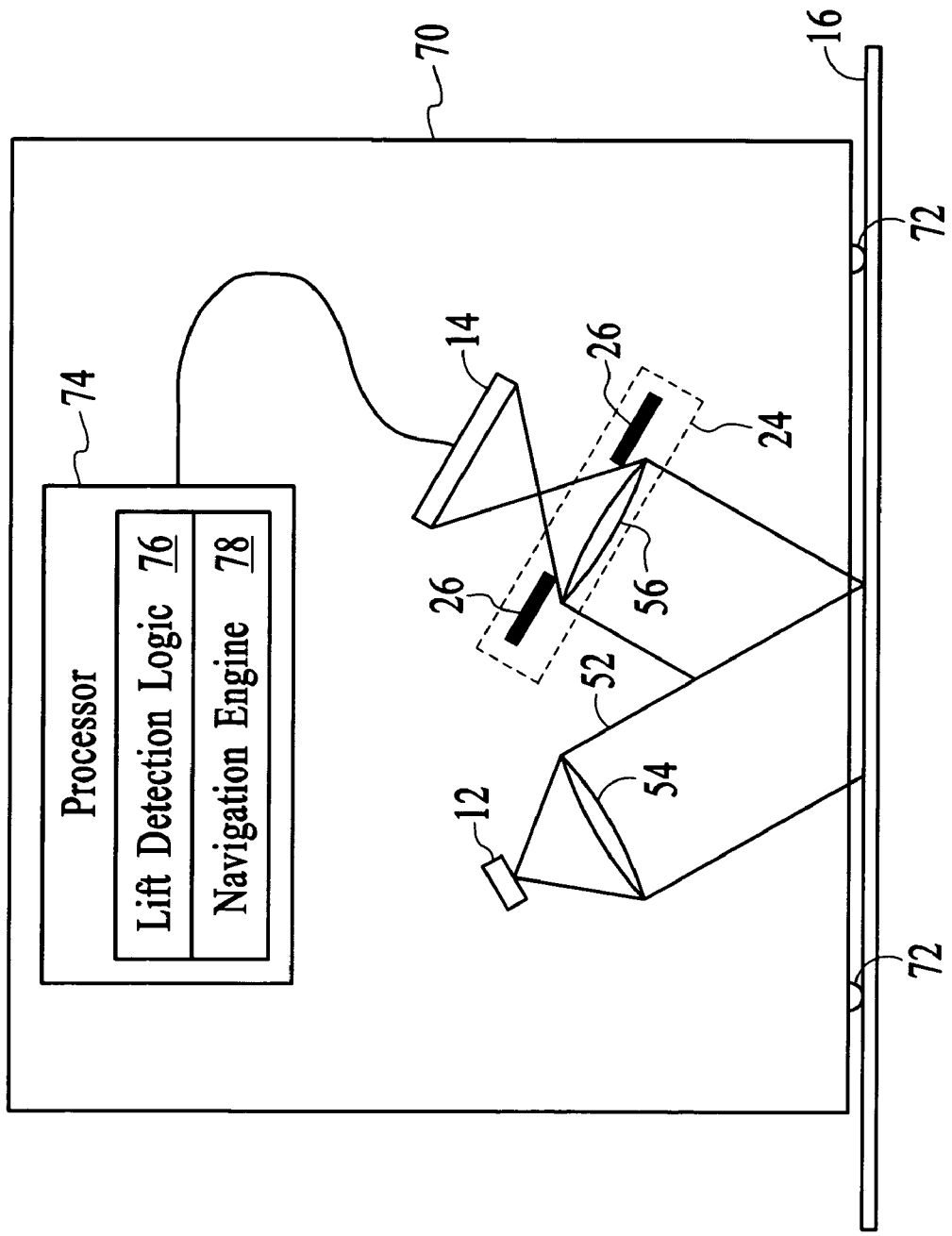
FIG. 9 depicts an example of an optical navigation device having a light source, a collimating lens, a reducing structure, an image sensor, and a processor that includes lift detection logic and a navigation engine.

In an embodiment in accordance with the invention, the above-described technique for tracking separation between a surface and a light source/image sensor is incorporated into an optical navigation device such as a computer mouse. FIG. 9 depicts an example of an optical navigation device 70 that optionally includes glide pads 72, a light source 12, a collimating lens 54, a reducing structure 24, a sensor 14 such as a 1-D or 2-D image sensor, and a processor 74 having lift detection logic 76 and a navigation engine 78. The light source 12, collimating lens 54, reducing structure 24, and sensor 14 are configured as described above with reference to FIGS. 3–7 to enable lift detection. The glide pads 14 allow the optical navigation device 70 to move over the navigation surface 16 and ensure that a constant distance is maintained between the optical navigation device 70 and the navigation surface 16 while the optical navigation device 70 sits on the surface. The navigation engine 78 is configured to track lateral motion of the computer mouse (i.e., motion in the x-y plane) relative to the surface 16. The navigation engine 78 tracks lateral motion by, for example, correlating successive frames of image information or spatial filtering to determine relative lateral displacement. Examples of these optical navigation techniques are described in the previously referenced U.S. patents. Although some examples of navigation techniques are described herein, the particular navigation technique used does not limit the invention. Other navigation techniques are expected to be used with the invention. Further, navigation techniques that use electromagnetic signals in spectrums other than the visible spectrum may be used with the invention.

Figure 10:
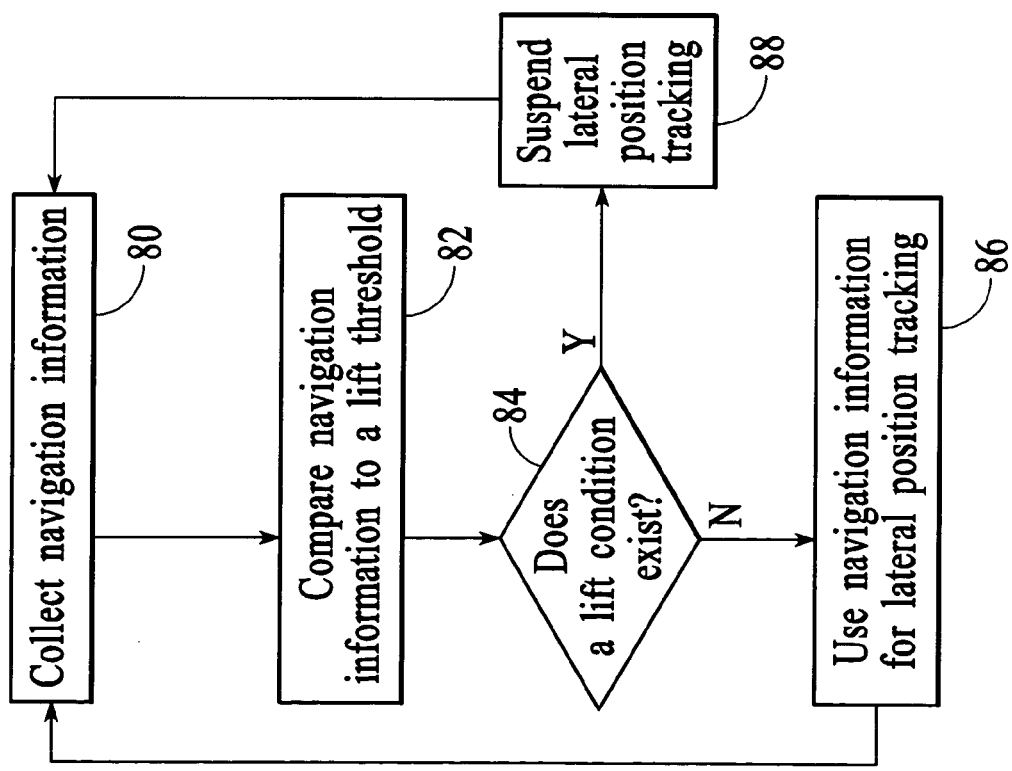
FIG. 10 depicts the relationship between the navigation and lift detection operations that are performed by the navigation engine and lift detection logic.

The lift detection logic 76 determines whether or not a lift condition exists by comparing navigation information to, for example, a pre-established lift threshold. FIG. 10 depicts the relationship between the navigation and lift detection operations that are performed by the navigation engine 78 and lift detection logic 76. At block 80, navigation information is collected by the sensor 14. At block 82, the navigation information is compared to the lift threshold by the lift detection logic 76. At decision point 84, it is determined whether or not a lift condition exists. In an embodiment in accordance with the invention, a lift condition exists when a characteristic of the detected light reaches the lift threshold as described above. If it is determined that a lift condition does not exist (i.e., the computer mouse is sitting on the navigation surface), then the navigation information is used by the navigation logic 78 to track lateral position (block 86). If on the other hand, a lift condition does exist (i.e., the computer mouse has been lifted off of the navigation surface), lateral position tracking is suspended (block 88). In this embodiment in accordance with the invention, the lift detection logic 76 is configured to produce a binary output that indicates whether or not a lift condition exists. The navigation function is then either activated or suspended in response to the binary output from the lift detection logic 76.

Figure 11:
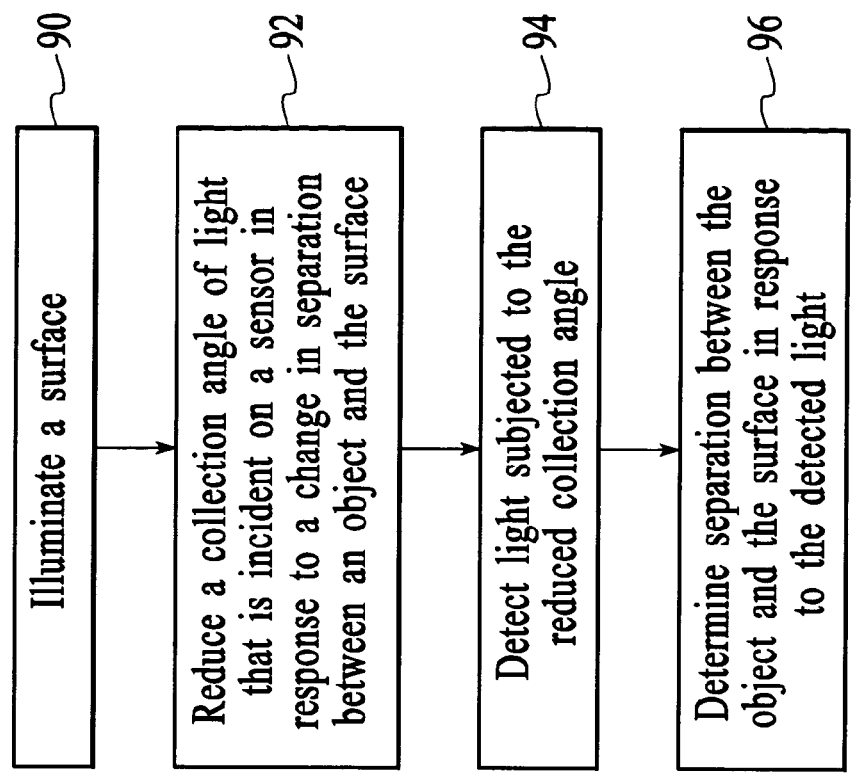
FIG. 11 is a process flow diagram of a method for tracking separation between an object and a surface.

FIG. 11 is a process flow diagram of a method for tracking separation between an object and a surface. At block 90, a surface is illuminated. At block 92, a collection angle of light that is incident on a sensor is reduced in response to a change in separation between an object and the surface. At block 94, light subjected to the reduced collection angle is detected. At block 96, separation between the object and the surface is determined in response to the detected light.

Although the reducing structure 24 is depicted as an aperture 26 or an aperture and lens 56 in FIGS. 3, 4, 7A, 7B, and 9, the reducing structure can be any element or combination of elements that reduces the collection angle of light relative to a sensor in response to a change in separation between the surface and the light source/sensor 12, 14. For example, the reducing structure may include an aperture, a lens, a reflective element, absorbing element, or any combination thereof.

Although very basic optical path arrangements are described with reference to FIGS. 3–9, other more complex optical path arrangements are contemplated. For example, an actual implementation may include an optical path that includes multiple optical elements (e.g., reflectors, lenses) to manipulate the light path from the light source to the image sensor. Further, the separation tracking technique can be implemented using collimated light, diverging light, converging light, or any combination thereof.

The navigation information includes image information as depicted in FIGS. 8A and 8B when image correlation is used for lateral position tracking. Alternatively, the navigation information could include, for example, spatially filtered data when spatial filtering is used for lateral position tracking.

As used herein, the light source generates an electromagnetic signal in the visible spectrum. However, the terms "light" and "illuminating" should not be limited to electromagnetic signals in the visible spectrum. The technique for tracking separation can be applied to electromagnetic energy outside of the visible spectrum (e.g., radio frequency, infrared, and terahertz signals).

Although the separation tracking technique is described in conjunction with an optical navigation device that uses a sensor such as a 1-D or 2-D sensor array to track lateral position, the separation tracking technique can be implemented without lateral position tracking. In an implementation that does not include lateral position tracking, separation tracking can be accomplished with a single photosensor instead of a more complex image sensor, which includes an array of individual photosensors. When a single photosensor is used, separation is determined in response to the output from the single photosensor.

Although specific embodiments in accordance with the invention have been described and illustrated, the invention is not to be limited to the specific forms or arrangements of parts so described and illustrated. The scope of the invention is to be defined by the claims appended hereto and their equivalents.

What is claimed is:

1. A method for tracking separation between an object and a surface comprising:
   illuminating a surface;
   reducing a collection angle of light that is incident on a sensor in response to a change in separation between an object and the surface;
   detecting light subjected to the reduced collection angle; and
   determining separation between the object and the surface in response to the detected light.

2. The method of claim 1 wherein determining separation between the object and the surface comprises comparing a characteristic of the detected light to a lift threshold.

3. The method of claim 2 wherein the lift threshold is defined in terms of light intensity.

4. The method of claim 2 further including indicating a lift condition when the detected light reaches the lift threshold.

5. The method of claim 1 wherein detecting light subjected to the reduced collection angle comprises detecting light with an image sensor, the image sensor including an array of individual photosensors that generate navigation information.

6. The method of claim 5 wherein determining separation between the object and the surface comprises comparing a characteristic of the navigation information to a lift threshold.

7. The method of claim 6 further including indicating a lift condition when the compared characteristic of the navigation information reaches the lift threshold.

8. The method of claim 7 wherein the characteristic of the navigation information is one of total intensity, bright pixel count, dark pixel count, and intensity gradient.

9. The method of claim 1 wherein reducing the collection angle involves subjecting the reflected light to an aperture.

10. The method of claim 1 wherein reducing the collection angle involves subjecting the reflected light to a lens.

11. An optical navigation device comprising:
   a light source configured to illuminate a surface;
   a sensor configured to generate navigation information in response to light that reflects off of the surface;
   a reducing structure, located in an optical path between the light source and the sensor, configured to reduce a collection angle of light that is incident on the sensor in response to a change in separation between the optical navigation device and the surface;
   a navigation engine configured to generate lateral position information relative to the surface in response to the navigation information; and
   lift detection logic configured to generate lift information related to the optical navigation device relative to the surface in response to the navigation information from the sensor.

12. The system of claim 11 wherein the lift detection logic is further configured to compare a characteristic of the navigation information to a lift threshold.

13. The system of claim 12 wherein the lift detection logic is further configured to indicate a lift condition when the compared characteristic of the navigation information reaches the lift threshold.

14. The system of claim 13 wherein the characteristic of the navigation information is one of total intensity, bright pixel count, dark pixel count, and intensity gradient.

15. The system of claim 13 wherein the generation of lateral position information by the navigation engine is suspended when the lift detection logic indicates a lift condition.

16. The system of claim 11 wherein the reducing structure comprises an aperture.

17. A method for tracking separation between an optical navigation device and a surface comprising:

illuminating a surface with light from an optical navigation device;

reducing a collection angle of light that is incident on a sensor in response to a change in separation between the optical navigation device and the surface;

collecting navigation information from light that reflects off of the surface and is subjected to the reduced collection angle; and using the navigation information to track the lateral position of the optical navigation device relative to the surface and to identify a lift condition of the optical navigation device relative to the surface.

18. The method of claim 17 wherein determining separation between the optical navigation device and the surface comprises comparing a characteristic of the navigation information to a lift threshold.

19. The method of claim 18 further including indicating a lift condition when the compared characteristic of the navigation information reaches the lift threshold.

20. The method of claim 19 further including suspending the tracking of lateral position when a lift condition is indicated.

* * * * *

(12) INTER PARTES REEXAMINATION CERTIFICATE (622nd)
United States Patent
Xie et al.

(10) Number: US 7,189,985 C1
(45) Certificate Issued: Jun. 13, 2013

(54) TRACKING SEPARATION BETWEEN AN OBJECT AND A SURFACE USING A REDUCING STRUCTURE

(75) Inventors: Tong Xie, San Jose, CA (US); Marshall T DePue, San Jose, CA (US); Susan Hunter, Fort Collins, CO (US)

(73) Assignee: Pixart Imaging Inc., Science-Based Industrial Park, Hsin-Chu (TW)

Reexamination Request:
No. 95/001,662, Jun. 16, 2011

Reexamination Certificate for:
Patent No.: 7,189,985
Issued: Mar. 13, 2007
Appl. No.: 10/977,720
Filed: Oct. 30, 2004

(51) Int. Cl.
*G01N 21/86* (2006.01)
(52) U.S. Cl.
USPC ............. 250/559.29; 250/559.24; 250/559.38

(58) Field of Classification Search
None
See application file for complete search history.

(56) References Cited

To view the complete listing of prior art documents cited during the proceeding for Reexamination Control Number 95/001,662, please refer to the USPTO's public Patent Application Information Retrieval (PAIR) system under the Display References tab.

*Primary Examiner* — Albert J Gagliardi

(57) ABSTRACT

Tracking separation between an object and a surface involves illuminating the surface and reducing the collection angle of light that reflects off of the surface in response to a change in separation between the object and the surface. Reducing the collection angle of light that reflects off of the surface causes the amount of light that is detected to be dependent on the separation distance between the object and the surface. The amount of detected light is then used as an indication of the separation distance.

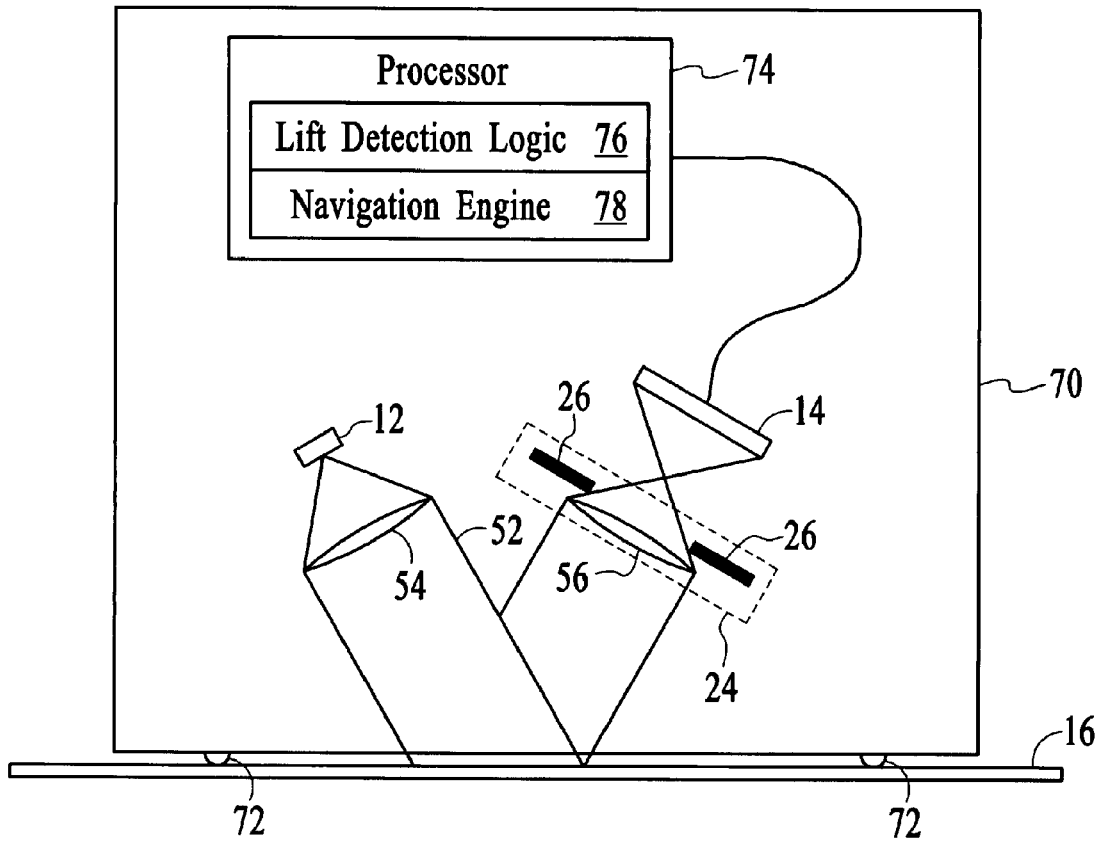

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 8 and 14 are cancelled.

Claims 1, 2, 4, 6, 7, 11, 12, 13, 17, 18 and 19 are determined to be patentable as amended.

Claims 5, 9, 10, 15, 16 and 20, dependent on an amended claim, are determined to be patentable.

New claims 21-61 are added and determined to be patentable.

1. A method for tracking separation between an object and a surface comprising:
    illuminating a surface;
    reducing a collection angle of light that is incident on a sensor in response to a change in separation between an object and the surface;
    detecting light subjected to the reduced collection angle, *the detected light having an intensity*; and
    determining separation between the object and the surface in response to *a shift in a center of mass of the intensity of* the detected light.

2. The method of claim 1 wherein determining separation between the object and the surface comprises comparing [a characteristic] *the shift in the center of mass of the intensity* of the detected light to a lift threshold.

4. The method of claim 2 further including indicating a lift condition when the *shift in the center of mass of the intensity of the* detected light reaches the lift threshold.

6. The method of claim 5 wherein determining separation between the object and the surface comprises comparing a [characteristic] *shift in the center of mass of the intensity* of the navigation information to a lift threshold.

7. The method of claim 6 further including indicating a lift condition when the [compared characteristic] *shift in the center of mass of the intensity* of the navigation information reaches the lift threshold.

11. An optical navigation device comprising:
    a light source configured to illuminate a surface;
    a sensor configured to generate navigation information in response to light that reflects off of the surface;
    a reducing structure, located in an optical path between the light source and the sensor, configured to reduce a collection angle of light that is incident on the sensor in response to a change in separation between the optical navigation device and the surface;
    a navigation engine configured to generate lateral position information relative to the surface in response to the navigation information; and
    lift detection logic configured to generate lift information related to the optical navigation device relative to the surface in response to the navigation information from the sensor *indicating a shift in a center of mass of intensity of the light that is incident on the sensor*.

12. The system of claim 11 wherein the lift detection logic is further configured to compare [a characteristic of the navigation information] *the shift in the center of mass of the intensity* to a lift threshold.

13. The system of claim 12 wherein the lift detection logic is further configured to indicate a lift condition when the [compared characteristic of the navigation information] *shift in the center of mass of the intensity* reaches the lift threshold.

17. A method for tracking separation between an optical navigation device and a surface comprising:
    illuminating a surface with light from an optical navigation device;
    reducing a collection angle of light that is incident on a sensor in response to a change in separation between the optical navigation device and the surface;
    collecting navigation information from light that reflects off of the surface and is subjected to the reduced collection angle; and
    using the navigation information to track the lateral position of the optical navigation device relative to the surface and to identify a lift condition of the optical navigation device relative to the surface *based on a detection of a shift in a center of mass of intensity of the light that is incident on the sensor*.

18. The method of claim 17 wherein determining separation between the optical navigation device and the surface comprises comparing [a characteristic of the navigation information] *the shift in the center of mass of the intensity* to a lift threshold.

19. The method of claim 18 further including indicating a lift condition when the [compared characteristic of the navigation information] *shift in the center of mass of the intensity* reaches the lift threshold.

*21. The method of claim 1, wherein reducing the collection angle comprises placing a reducing structure in an optical path between the sensor and the surface.*

*22. The method of claim 21, wherein the sensor and the reducing structure are configured such that the center of mass of the intensity of the detected light is aligned near a center of the sensor when the object is at a near position with respect to the surface.*

*23. The method of claim 21, wherein the sensor and the reducing structure are configured such that the center of mass of the intensity of the detected light shifts away from a center of the sensor when the object is moved from a near position to a far position with respect to the surface.*

*24. The method of claim 1, wherein the light comprises electromagnetic energy outside of the visible spectrum.*

*25. The system of claim 11, wherein the reducing structure is located in an optical path between the sensor and the surface.*

*26. The system of claim 25, wherein the sensor and the reducing structure are configured such that the center of mass of intensity of the light is aligned near a center of the sensor when the optical navigation device is at a near position with respect to the surface.*

*27. The system of claim 25, wherein the sensor and the reducing structure are configured such that the center of mass of intensity of the light shifts away from a center of the sensor when the optical navigation device is moved from a near position to a far position with respect to the surface.*

*28. The system of claim 11, wherein the light comprises electromagnetic energy outside of the visible spectrum.*

*29. The method of claim 17, wherein reducing the collection angle comprises placing a reducing structure in an optical path between the sensor and the surface.*

30. The method of claim 29, wherein the sensor and the reducing structure are configured such that the center of mass of intensity of the light is aligned near a center of the sensor when the optical navigation device is at a near position with respect to the surface.

31. The method of claim 29, wherein the sensor and the reducing structure are configured such that the center of mass of intensity of the light shifts away from a center of the sensor when the optical navigation device is moved from a near position to a far position with respect to the surface.

32. The method of claim 17, wherein the light comprises electromagnetic energy outside of the visible spectrum.

33. A method for tracking separation between an object and a surface comprising:
    illuminating a surface;
    reducing a collection angle of light that is incident on a sensor in response to a change in separation between an object and the surface;
    detecting light subjected to the reduced collection angle, the detected light having an intensity center; and
    determining separation between the object and the surface in response to a shift of the intensity center of the detected light.

34. The method of claim 33, wherein determining separation between the object and the surface comprises comparing the shift of the intensity center of the detected light to a lift threshold.

35. The method of claim 34, further including indicating a lift condition when the shift of the intensity center of the detected light reaches the lift threshold.

36. The method of claim 33, wherein detecting light subjected to the reduced collection angle comprises detecting light with an image sensor, the image sensor including an array of individual photosensors that generate navigation information.

37. The method of claim 36, wherein determining separation between the object and the surface comprises comparing a shift of the intensity center of the navigation information to a lift threshold.

38. The method of claim 37, further including indicating a lift condition when the shift of the intensity center of the navigation information reaches the lift threshold.

39. The method of claim 33, wherein reducing the collection angle involves subjecting the reflected light to an aperture.

40. The method of claim 33, wherein reducing the collection angle involves subjecting the reflected light to a lens.

41. The method of claim 33, wherein reducing the collection angle comprises placing a reducing structure in an optical path between the sensor and the surface.

42. The method of claim 41, wherein the sensor and the reducing structure are configured such that the intensity center of the detected light is aligned near a center of the sensor when the object is at a near position with respect to the surface.

43. The method of claim 41, wherein the sensor and the reducing structure are configured such that the intensity center of the detected light shifts away from a center of the sensor when the object is moved from a near position to a far position with respect to the surface.

44. The method of claim 33, wherein the light comprises electromagnetic energy outside of the visible spectrum.

45. An optical navigation device comprising:
    a light source configured to illuminate a surface;
    a sensor configured to generate navigation information in response to light that reflects off of the surface;
    a reducing structure, located in an optical path between the light source and the sensor, configured to reduce a collection angle of light that is incident on the sensor in response to a change in separation between the optical navigation device and the surface;
    a navigation engine configured to generate lateral position information relative to the surface in response to the navigation information; and
    lift detection logic configured to generate lift information related to the optical navigation device relative to the surface in response to the navigation information from the sensor indicating a shift of an intensity center of the light that is incident on the sensor.

46. The system of claim 45, wherein the lift detection logic is further configured to compare the shift of the intensity center to a lift threshold.

47. The system of claim 46, wherein the lift detection logic is further configured to indicate a lift condition when the shift of the intensity center reaches the lift threshold.

48. The system of claim 47, wherein the generation of lateral position information by the navigation engine is suspended when the lift detection logic indicates a lift condition.

49. The system of claim 45, wherein the reducing structure comprises an aperture.

50. The system of claim 45, wherein the reducing structure is located in an optical path between the sensor and the surface.

51. The system of claim 50, wherein the sensor and the reducing structure are configured such that the intensity center of the light is aligned near a center of the sensor when the optical navigation device is at a near position with respect to the surface.

52. The system of claim 50, wherein the sensor and the reducing structure are configured such that the intensity center of the light shifts away from a center of the sensor when the optical navigation device is moved from a near position to a far position with respect to the surface.

53. The system of claim 45, wherein the light comprises electromagnetic energy outside of the visible spectrum.

54. A method for tracking separation between an optical navigation device and a surface comprising:
    illuminating a surface with light from an optical navigation device;
    reducing a collection angle of light that is incident on a sensor in response to a change in separation between the optical navigation device and the surface;
    collecting navigation information from light that reflects off of the surface and is subjected to the reduced collection angle; and
    using the navigation information to track the lateral position of the optical navigation device relative to the surface and to identify a lift condition of the optical navigation device relative to the surface based on a detection of a shift of an intensity center of the light that is incident on the sensor.

55. The method of claim 54, wherein determining separation between the optical navigation device and the surface comprises comparing the shift of the intensity center to a lift threshold.

56. The method of claim 55, further including indicating a lift condition when the shift of the intensity center reaches the lift threshold.

57. The method of claim 56, further including suspending the tracking of lateral position when a lift condition is indicated.

58. The method of claim 54, wherein reducing the collection angle comprises placing a reducing structure in an optical path between the sensor and the surface.

59. The method of claim 58, wherein the sensor and the reducing structure are configured such that the intensity center of the light is aligned near a center of the sensor when the optical navigation device is at a near position with respect to the surface.

60. The method of claim 58, wherein the sensor and the reducing structure are configured such that the intensity center of the light shifts away from a center of the sensor when the optical navigation device is moved from a near position to a far position with respect to the surface.

61. The method of claim 54, wherein the light comprises electromagnetic energy outside of the visible spectrum.

\* \* \* \* \*